United States Patent [19]
Yamamoto et al.

[11] Patent Number: 5,748,829
[45] Date of Patent: May 5, 1998

[54] STILL IMAGE SIGNAL PROCESSING DEVICE EMPLOYING PEDESTAL LEVEL DATA

[75] Inventors: Yasuhiro Yamamoto; Koichi Sato, both of Tokyo, Japan

[73] Assignee: Asahi Kogaku Kogyo Kabushiki Kaisha, Tokyo, Japan

[21] Appl. No.: 652,171

[22] Filed: May 23, 1996

Related U.S. Application Data

[63] Continuation of Ser. No. 251,577, May 31, 1994, abandoned.

[30] Foreign Application Priority Data

May 31, 1993 [JP] Japan ................... 5-153047

[51] Int. Cl.$^6$ ................................. H04N 5/91
[52] U.S. Cl. ................ 386/46; 386/125; 348/718
[58] Field of Search ................. 386/36, 121, 122, 386/46, 125; 360/22, 23; 348/588, 559, 560, 714, 718, 719, 720; H04N 5/76, 5/92, 9/79

[56] References Cited

U.S. PATENT DOCUMENTS

| | | |
|---|---|---|
| 4,607,360 | 8/1986 | Fukui . |
| 4,614,981 | 9/1986 | Fukui . |
| 4,631,600 | 12/1986 | Fukui . |
| 4,660,096 | 4/1987 | Arlan et al. ............. 358/310 |
| 5,153,740 | 10/1992 | Sato . |
| 5,159,460 | 10/1992 | Senso ...................... 358/310 |
| 5,181,122 | 1/1993 | Ooishi ...................... 358/238 |
| 5,200,862 | 4/1993 | Sato . |
| 5,225,913 | 7/1993 | Sato . |
| 5,339,167 | 8/1994 | Kuroda ...................... 358/339 |
| 5,363,264 | 11/1994 | Cavanaugh et al. ......... 360/11.1 |
| 5,434,625 | 7/1995 | Willis ...................... 348/564 |

FOREIGN PATENT DOCUMENTS

| | | | |
|---|---|---|---|
| 0423979 | 10/1990 | European Pat. Off. | H04N 9/79 |
| 1177289 | 7/1989 | Japan | H04N 5/92 |
| 322687A | 1/1991 | Japan | H04N 5/92 |
| 3125187 | 5/1991 | Japan . | |

*Primary Examiner*—Tommy P. Chin
*Assistant Examiner*—Y. Lee
*Attorney, Agent, or Firm*—Greenblum & Bernstein, P.L.C.

[57] ABSTRACT

A high precision image signal is converted into digital data including a pedestal level and is written in a memory. An original frame is divided into a plurality of frames, and image data is read out from the memory for every divided frame. At the time of reading out of the image data on the left side of the divided frame, that image data is read out in the same order as the order of writing to the memory. At the time of reading out of the image data on the right side on the divided frame, that image data is read out in an order inverse to the order of writing to the memory. At the time of read out, the data of the pedestal level written in the memory is repeatedly read out, whereby a blanking period of the still video format is formed.

16 Claims, 9 Drawing Sheets

STILL IMAGE SIGNAL PROCESSING DEVICE EMPLOYING PEDESTAL LEVEL DATA

BACKGROUND OF THE INVENTION

This application is a continuation of application Ser. No. 08/251,577, filed May 31, 1994, now abandoned.

1. Field of the Invention

The present invention relates to an image signal processing device for recording an image signal of a still image on a recording medium such as a magnetic disk.

2. Description of the Related Art

A conventional still video device is constituted so as to perform FM modulation on an image signal obtained by an image sensor etc. and to record the same on a magnetic disk according to a predetermined format. The bandwidth of the signal to be recorded on the tracks of the magnetic disk is limited due to the structure of the disk device and cannot be endlessly enlarged. Accordingly, even if a high quality, wide bandwidth image signal is inputted to a still video device, there is a limitation in the resolution of the image and the quality of that input image is lowered.

Contrary to this, in a still video device of a configuration which divides an image signal corresponding to one frame into a plurality of parts and stores the same in a memory and, at the same time, time-extends these plurality of image signal parts and records the same on a plurality of tracks of the magnetic disk, a high quality image signal inputted from the outside can be recorded on the magnetic disk without a reduction of the resolution. However, at the time of the recording to the magnetic disk, the horizontal and vertical blanking period used for example, by the NTSC system, must be added to the image signal. Therefore, in this still video device, a gate circuit is connected to an output terminal of the memory, and when an image signal read out from the memory is recorded on the magnetic disk, the input of data to the D/A converter is prevented for a predetermined period, whereby the horizontal and vertical blanking period is formed.

The same number of gate circuits for forming such a horizontal and vertical blanking period must be provided as the number of the data lines connected to the memory. For this reason, the circuit structure of the conventional still video device is complex, which becomes an obstacle to the reduction of size of the still video device.

SUMMARY OF THE INVENTION

Accordingly, an object of the present invention is to simplify the circuit structure of a still video device by eliminating the need for the circuit components for producing the horizontal and vertical blanking period.

According to the present invention, there is provided a still image signal processing device comprising memory means, writing means and first reading means.

The memory means is provided for storing a first image signal generated in accordance with a first mode. The first image signal has an image signal data and pedestal level data in one horizontal scanning period. The writing means writes the first image signal in the memory means in such a manner that the pedestal level data and the image signal data are stored in the order in which the pedestal level data and the image signal data are inputted in the image processing device. The first reading means reads the first image signal from the memory to generate a second image signal in accordance with a second mode. The reading means reads the first image signal in such a manner that the first image signal is divided into a first half and a latter half at a predetermined point of the first image signal. The reading means reads the first half and the latter half in such a manner that a blanking period of the second mode is formed in accordance with the pedestal level data.

DESCRIPTION OF THE PREFERRED EMBODIMENTS

The present invention will be described with reference to embodiments shown in the drawings.

Figure 1:
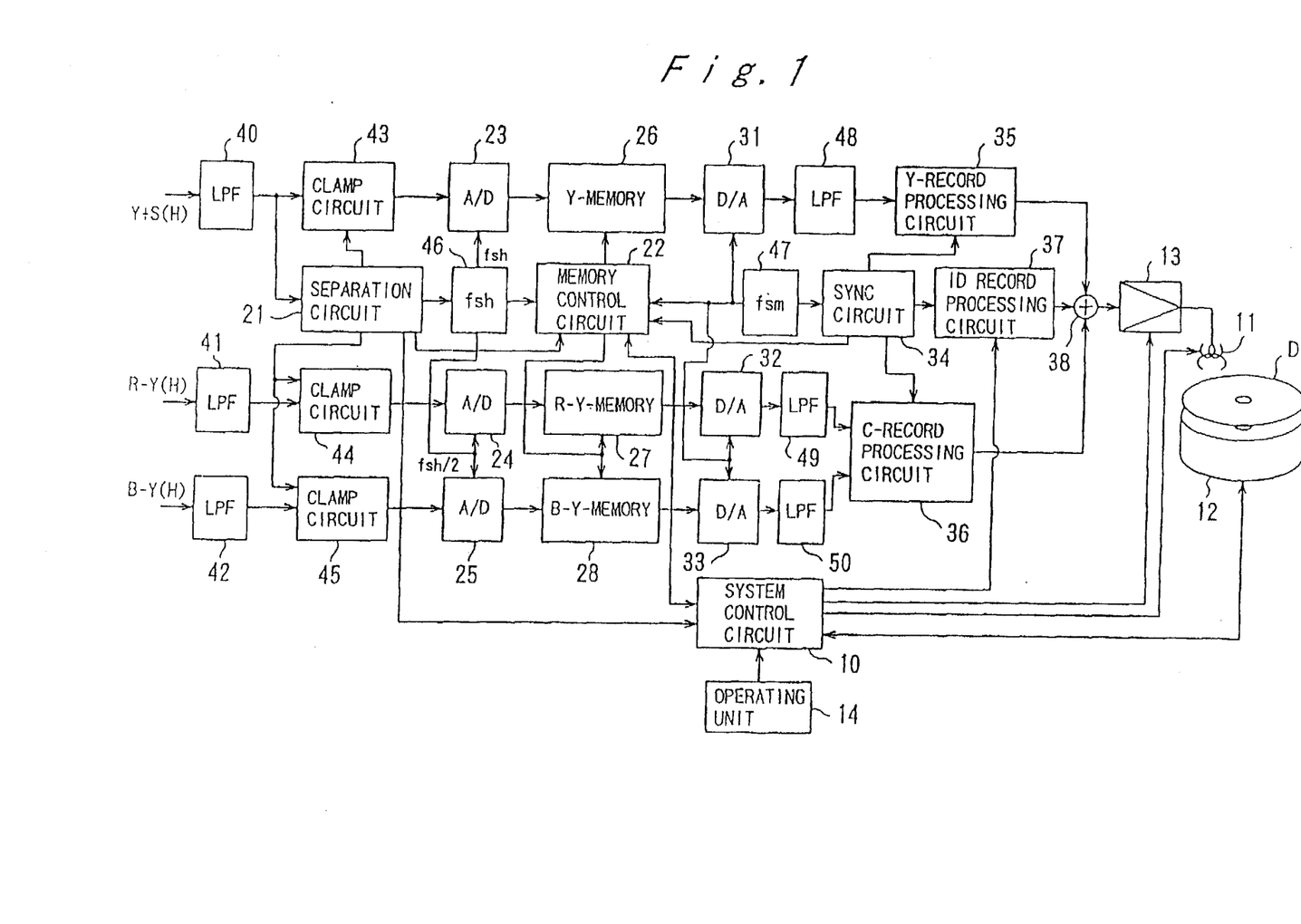
FIG. 1 is a block diagram of a recording system of a still video device to which one embodiment of the present invention is applied.

FIG. 1 is a block diagram of a recording system of a still video device to which an embodiment of the present invention is applied.

A system control circuit 10 comprises a microcomputer, which performs the control of the entire still video device. The disk device has a magnetic head 11 and a spindle motor 12 for driving a magnetic disk D to make it rotate. The magnetic head 11 is subjected a tracking control by the system control circuit 10 and moved along the radial direction of the magnetic disk D. The spindle motor 12 is controlled by the system control circuit 10 and rotates the magnetic disk D at a rotation speed of, for example, 3600 rpm.

During the rotation of the magnetic disk D, the magnetic head 11 is positioned at a predetermined track of the magnetic disk D and records an FM modulated image signal and a DPSK (Differential Phase Shift Keying) modulated ID code on this track. A recording amplifier 13 is controlled by the system control circuit 10 and outputs an image signal etc. to the magnetic head 11. Note that the magnetic disk D has 52 tracks. Signals, such as the image signal, are recorded on 50 tracks, counting from the outermost circumferential track to the inner circumference side.

An operating unit 14 connected to the system control circuit 10 is used for operating the still video device. Note that, ID code concerning the image to be recorded on the magnetic disk D, (that is, the data of the recording mode, date the photograph was taken, etc.,) are also inputted via this operating unit 14.

A high quality image signal obtained from a still video camera (not shown) or an external input terminal (not shown) is inputted as a luminance signal (Y+S (H)) including a synchronizing signal S and differential color signals (R−Y (H), B−Y (H)) to the still video device. In the figures, the letter (H) appended to the input signals indicates that the signals are produced according to an HDTV system (for example, a high vision system).

The luminance signal (Y+S (H)) has its high frequency component removed by a low pass filter 40 and is inputted to a synchronizing signal separation circuit 21 and a clamp circuit 43. In the clamp circuit 43, the pedestal level of the luminance signal is clamped to a reference level of an A/D conversion in an A/D converter 23. On the other hand, in the synchronizing signal separation circuit 21, a composite synchronizing signal $\overline{C.SYNC1}$ is separated from the luminance signal, and a blanking signal $\overline{C.BLK1}$ in synchronization with this composite synchronizing signal $\overline{C.SYNC1}$ is produced. The composite synchronization signal $\overline{C.SYNC1}$ and blanking signal $\overline{C.BLK1}$ are inputted to the clock generation circuit 46, a memory control circuit 22, and the system control circuit 10, respectively. The blanking signal $\overline{C.BLK1}$ corresponds to a blanking period in which a horizontal synchronizing signal and a vertical synchronizing signal are provided.

In the clock generation circuit 46, a clock fsh of about 74.25 MHz is produced in synchronization with the composite synchronizing signal $\overline{C.SYNC1}$, etc. and is outputted to the A/D converter 23. The luminance signal from which the composite synchronizing signal $\overline{C.SYNC1}$ is removed is sampled according to the clock fsh and converted to a digital signal in the A/D converter 23.

Similarly, the differential color signals (R−Y (H), B−Y (H)) have their high frequency components removed by the low pass filters 41 and 42, and then, their pedestal levels are clamped by the clamp circuits 44 and 45. Then, these differential color signals are sampled according to a clock fsh/2 inputted from the clock generation circuit 46 and converted to digital signals at the A/D converters 24 and 25.

The digital luminance signals are sequentially written in at predetermined addresses of a Y memory 26 according to the clock fsh and the digital differential color signals are sequentially written in predetermined addresses of a R−Y memory 27 and a B−Y memory 28 according to the clock fsh/2. The data writing address of these Y memory 26, R−Y memory 27, and the B−Y memory 28 is controlled by the memory control circuit 22.

When writing one frame's worth or one field's worth of data to the Y memory 26, R−Y memory 27, and the B−Y memory 28 is completed, a writing completion signal is outputted from the memory control circuit 22, whereby the magnetic head 11 is controlled by the system control circuit 10 to move to an empty track on the magnetic disk D.

Note that the control of movement of the magnetic head 11 to the blank track is carried out according to information stored in a work memory provided in the still video device, that is, information concerning the respective tracks of the magnetic disk D.

In the memory control circuit 22, an address value is produced in synchronization with a clock fsm (frequency of fsh/4 or more) outputted from the clock generation circuit 47 and outputted to the Y memory 26, the R−Y memory 27, and the B−Y memory 28. Then, the luminance signal Y of the Y memory 26, the differential color signal (R−Y) of the R−Y memory 27, and the differential color signal (B−Y) of the B−Y memory 28 are read out and are converted to analog signals by the D/A converters 31, 32, and 33. Note that the data read out address values of the respective memories 26, 27, and 28 are produced by the memory control circuit 22, and these read out address values are updated in synchronization with the clock fsm. Also, these clocks fsm are also inputted to the D/A converters 31, 32, and 33 and used for timing clocks of a D/A conversion.

In the synchronizing signal generation circuit 34, a composite synchronizing signal $\overline{C.SYNC2}$ of the NTSC system is produced in synchronization with the clock fsm outputted from the clock generation circuit 47, and a blanking signal $\overline{C.BLK2}$ is produced based on this composite synchronizing signal $\overline{C.SYNC2}$. The blanking signal $\overline{C.BLK2}$ corresponds to a blanking period in which a horizontal synchronizing signal and a vertical synchronizing signal according to the NTSC system are provided.

The luminance signal Y and differential color signals (R−Y, B−Y) converted to the analog signals have their high frequency components removed by the low pass filters 48, 49, and 50, respectively. The luminance signal is inputted to a Y recording processing circuit 35, and the differential color signals are inputted to a C recording processing circuit 36.

In the Y recording processing circuit 35, the NTSC system composite synchronizing signal $\overline{C.SYNC2}$ is added to the luminance signal Y, and the luminance signal (Y+S) obtained by this is subjected to FM modulation and inputted to an adder 38. On the other hand, the differential color signals (R−Y, B−Y) are subjected to FM modulation at the C recording processing circuit 36 and inputted to the adder 38. In this input operation, linear sequential recording of the differential color signals (R−Y, B−Y) is carried out at the time of image signal recording to the magnetic disk D, and the differential color signal (B−Y) and the differential color signal (R−Y) are alternately switched every one horizontal scanning period of the luminance signal (Y+S) from the Y recording processing circuit 35 and inputted to the adder 38.

Also, to the adder 38, information such as, for example, the ID code concerning the recording image signal, the date the photograph was taken, etc., is inputted from the ID recording processing circuit 37 after the DPSK modulation.

The luminance signal (Y+S), the differential color signals (R−Y, B−Y), and the ID code are superimposed on each other at the adder 38. The image signal produced by this is amplified at the recording amplifier 13 and is recorded on a predetermined track of the magnetic disk D via the magnetic head 11.

Figure 2:
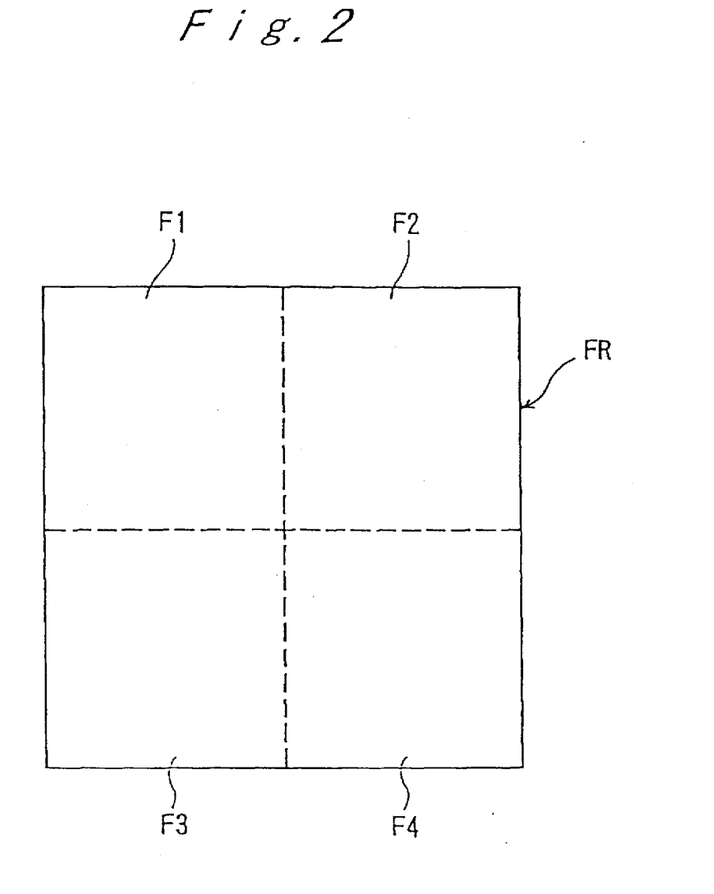
FIG. 2 is a view of a display frame of divided image signals (1 field) of a high vision system.
Figure 3:
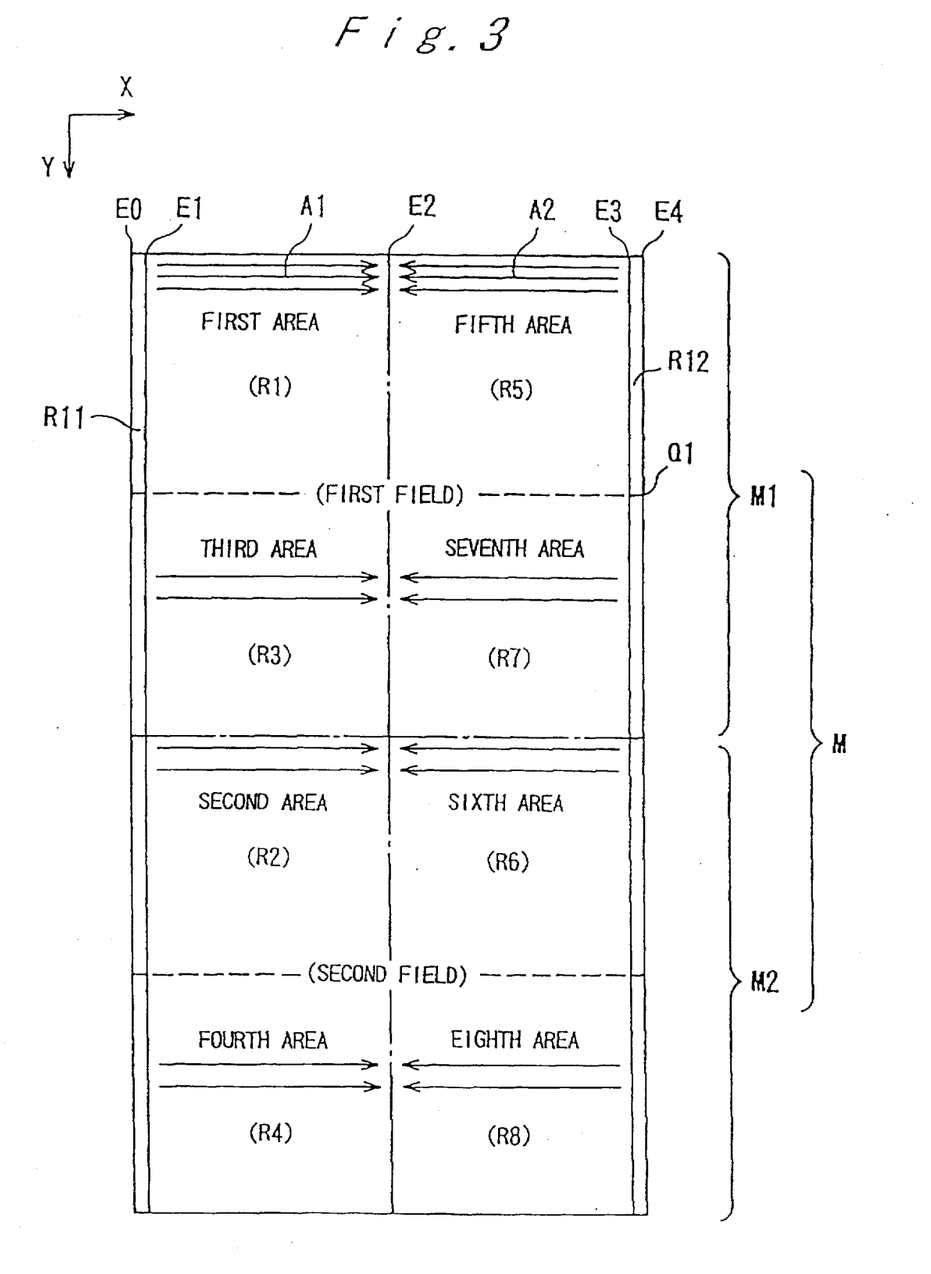
FIG. 3 is a view of the order of writing of data in a memory.
Figure 4:
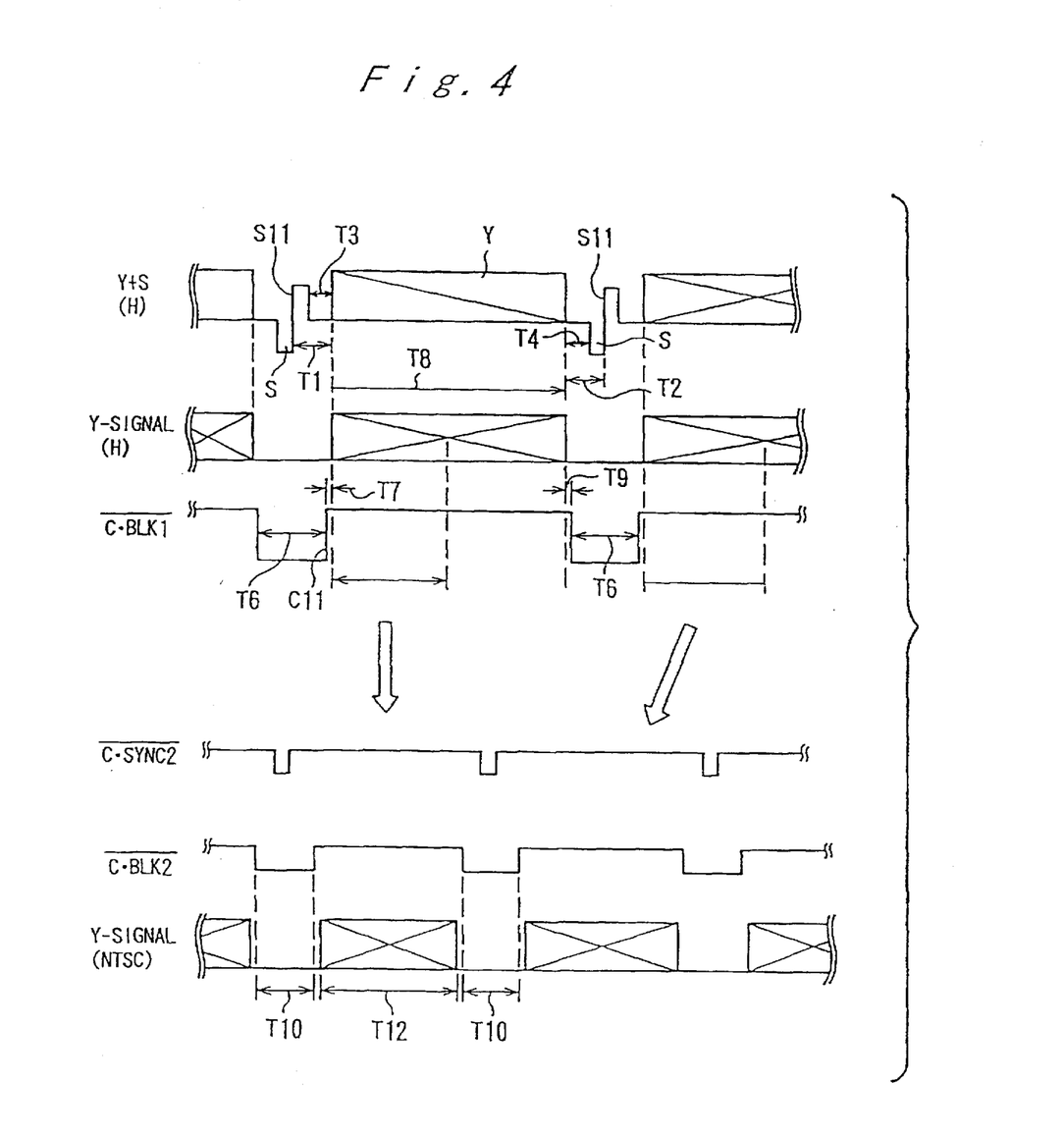
FIG. 4 is a view of a high vision signal and a luminance signal of an NTSC system recorded on a magnetic disk.

The order of writing data to the memory 26 will be described below with reference to FIG. 2 to FIG. 4. FIG. 2 shows a display frame of divided image signals of the high vision system, and FIG. 3 shows a memory map of the Y memory 26. FIG. 4 shows a luminance signal (Y+S (H)) according to the high vision system (high definition image mode) inputted to the still video device and the luminance signal of the NTSC system (usual image quality mode) recorded on the magnetic disk D.

As shown in FIG. 2, one frame FR is divided into four parts. The image signals constituting this frame are recorded by the frame recording mode and are constituted by first field image signals and second field image signals. The image signals of one field of each divided part of the frame are recorded on one track of the magnetic disk D. Namely, 8 tracks are necessary for recording the image signals constituting one frame.

In FIG. 3, memory area M indicates the entire memory area of the Y memory 26. The first field image signals of the high vision system are continuously stored in memory area M1, and the second field image signals of the high vision system are continuously stored in memory area M2.

The areas of the divided display frame FR and the areas of the Y memory 26 correspond to each other as follows: a first area R1 of the first field and a second area R2 of the second field in FIG. 3 correspond to a left top frame F1 shown in FIG. 2, a fifth area R5 and a sixth area R6 correspond to a right top frame F2. Also, a third area R3 and a fourth area R4 correspond to a left bottom frame F3, and a seventh area R7 and an eighth area R8 correspond to a right bottom frame F4. The luminance signals and differential color signals of the first to eighth areas R1 to R8 are recorded on one track.

As shown in FIG. 4, in the luminance signal (Y+S (H)) of the high vision system, there is a period T1=2.586 μs from a rising edge S11 of the horizontal synchronizing signal S until the luminance signal Y is started. A period T2 after the luminance signal Y is ended to the rising edge S11 of the horizontal synchronizing signal S is about 1.185 μs.

When a luminance signal (Y+S (H)) is subjected to A/D conversion and written in the Y memory 26, the writing address value to the memory 26 is fixed to the leading address of the memory 26 (address of symbol E0 of FIG. 3) during a low level period T6 of the blanking signal $\overline{C.BLK1}$. Then, in synchronization with a rising edge C11 of the blanking signal $\overline{C.BLK1}$, incrementation of the X value of the address (horizontal direction of frame) is started, so that the pedestal level in a period T7, the luminance signal in a period T8, and the pedestal level in a period T9 are subjected to A/D conversion and are written in the Y memory 26. Namely, the luminance signals and pedestal levels of one horizontal scanning period are sequentially written from a small address of the Y memory 26 (symbol E0) to a large address (symbol E4) of the Y memory 26 in the order of input. This order corresponds to the horizontal scanning direction of a frame.

When the writing of the luminance signals of one horizontal scanning period is completed, the Y value of the data writing address of the Y memory 26 (vertical direction of frame) is incremented by one. Namely, by the rising edge C11 of the next blanking signal $\overline{C.BLK1}$, the data and pedestal level of the luminance signal of the next one horizontal scanning period are written in an address having a Y value larger than that of the address at which they were written at a preceding time.

Note that the X value of the address corresponds to the coordinate value in the horizontal direction of the frame from which the image signal is outputted, and the Y value of the address corresponds to the coordinate value in the vertical direction of that frame.

Several pixels worth of the pedestal levels in the periods T7 and T9 are subjected to A/D conversion and written in front of or behind the data of the luminance signal of the Y memory 26, respectively. It is also possible to write only one pixel worth of data of the pedestal level in the Y memory 26.

In this way, the pedestal level before the data of the luminance signal (period T7 of FIG. 4) is written in an area R11 positioned on the left side of the first to fourth areas R1 to R4, and the pedestal level after the data of the luminance signal (period T9 of FIG. 4) is written in an area R12 positioned on the right side of the fifth to eighth areas R5 to R8. The data of areas R11 and R12 are used as the pedestal level when they are converted to an image signal format of the NTSC system (or a still video format) which are low quality image signals, described later, or another system.

Ten or so microseconds are needed as the blanking period in the NTSC system, but there are only about less than 3 microseconds for the blanking period in a high vision system. Therefore, in the NTSC system, the blanking period of the high vision system cannot be used as it is. Therefore, in the present embodiment, the blanking period of the NTSC system is formed as follows: when writing the image signal of a high vision system in the Y memory 26, at least one pixel worth of the data of the pedestal level is written in the areas R11 and R12 of the memory as described above, but the data of these areas R11 and R12 are repeatedly read out at the time of the read out operation from the Y memory as will be described later, whereby a blanking period matching the NTSC system is formed.

Note that, the writing and reading order of the data of the differential color signals (R–Y, R–B) to the memories 27 and 28 is similar to that for the above-mentioned luminance signal, and therefore an explanation thereof will be omitted.

Figure 5:
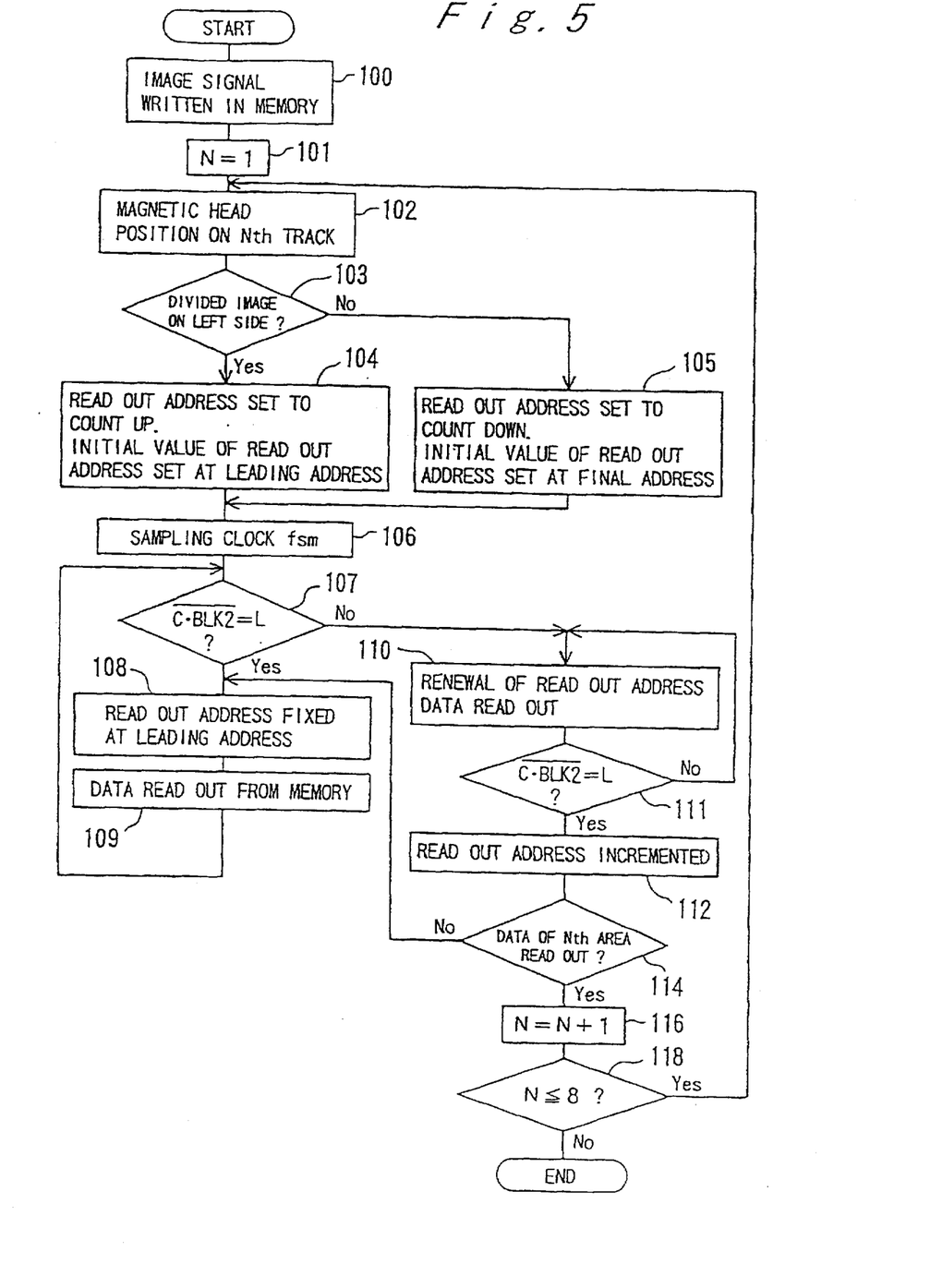
FIG. 5 is a flow chart of a control for dividing an input original image and recording the same on a magnetic disk.

The data writing control and read out control to and from the Y memory 26 will now be described referring to the FIGS. 2 to 4 and the flow chart of FIG. 5.

In step 100, one frame worth of luminance signals of the high vision system is written in the Y memory 26. In step 101, a parameter N is set to "1", and in step 102, the magnetic head 11 is positioned on a N-th track among the consecutive blank tracks on the magnetic disk D.

In step 103, it is determined whether the luminance signal to be recorded on the magnetic disk D corresponds to the divided image on the left side of the display frame FR (see FIG. 2) or the divided image on the right side, based on the value of the parameter N. When the value of the parameter N is "1", "2", "3", or "4", that is, where the luminance signal to be recorded on the magnetic disk D corresponds to the divided image on the left side, the processing of step 104 is carried out next, and when the value of the parameter N is "5", "6", "7", or "8", the processing of step 105 is carried out next.

In step 104, the system is set so that both of the X value and Y value of the read out address of the Y memory 26 are counted up, and an initial value of the X value of the read out address in the blanking period is set at the leading address of the Y memory 26 (address value of symbol E0 in FIG. 3). In step 106, the system is set so that the read out address value of the Y memory 26 is controlled by the clock fsm. Note that, clock fsm has a frequency lower than that of the clock fsh at the time of writing data to the Y memory 26 and is for converting an image signal of the high vision system to an image signal of the NTSC system.

In step 107, it is determined whether the blanking signal $\overline{C.BLK2}$ is at a low level. When it is at a low level, that is, when it is in a blanking period T10 (refer to FIG. 4), step 108 is executed and the X value of the read out address is fixed at the leading address value (E0) of the area R11 of the Y memory 26 (refer to FIG. 3). Then, in step 109, the data (pedestal level) is read out from that leading address, subjected to the D/A conversion, and written on the magnetic disk D.

When the read out of data (one pixel) from the Y memory 26 is ended, the operation routine returns from step 109 to step 107, at which it is determined whether the blanking signal $\overline{C.BLK2}$ is still in the blanking period T10. When it is in the blanking period T10, the X value of the read out address is not renewed, and the same data is repeatedly read out from the Y memory 26 (steps 107 to 109). By this, during the blanking period T10 of the blanking signal $\overline{C.BLK2}$ in FIG. 4, the data existing at the leading address of the area R11 of the Y memory 26 is repeatedly D/A-converted and written on the magnetic disk D.

The data existing at the leading address of the area R11 is a pedestal level existing in a final part of the blanking period T6 of the blanking signal $\overline{\text{C.BLK1}}$ at the time of writing of the luminance signal of the high vision system into the Y memory 26. Accordingly, when the luminance signal of the NTSC system is produced by the data read out from the Y memory 26, that pedestal level is used as it is as the NTSC system pedestal level data.

When the blanking period T10 is ended and the blanking signal $\overline{\text{C.BLK2}}$ changes to the high level, the processing routine shifts from step 107 to step 110, in which the read out of the luminance signal Y is carried out. Namely, the renewal of the read out address value is started, and the data of the Y memory 26 designated by a new address value is read out and written on the magnetic disk D.

The system is set so that the address value is counted up by step 104 when the data of the divided image on the left side is being read out, and therefore, in step 110, the X value of the address is incremented one by one in synchronization with the clock fsm, and the luminance signals are read out in a direction from the symbol E1 toward symbol E2 in FIG. 3 (an arrow direction indicated by a symbol A1), that is, from the area R11 side in which the pedestal level data is stored toward the division point E2 of the image. Contrary to this, the system is set so that the address value is counted down by step 105 when the data of the divided image on the right side is being read out, and therefore, in step 110, the luminance signals are read out in a direction from the symbol E3 toward symbol E2 in FIG. 3 (an arrow direction indicated by a symbol A2), that is, from the area R12 side in which the pedestal level data is stored toward the division point E2 of the image.

In step 111, it is determined whether the blanking signal $\overline{\text{C.BLK2}}$ is a low level. Namely, in this step, it is determined whether it has reached a new blanking period T10. In other words, it is determined whether one horizontal scanning period is ended. Where the read out of the luminance signal of one horizontal scanning period has not yet been completed, in step 110, the X value of the read out address is incremented by one and new data is read out from the Y memory 26.

When it is determined in step 111 that one horizontal scanning period is ended, the Y value of the read out address is incremented by one in step 112, and in step 114, it is determined whether the data read out of the N-th area of the Y memory 26 is completed. Where the data read out of the N-th area has not yet been completed, the processing routine returns to step 108, in which, as described above, processings of steps 107 to 109 are repeatedly executed, and the blanking period of the NTSC system is produced. Then, when it is determined again in step 107 that the blanking signal $\overline{\text{C.BLK2}}$ changes to a high level, the processing routine shifts to step 110 again, in which the luminance signal Y of the next horizontal scanning period is read out.

In step 114, when it is determined that the data of the N-th area of the Y memory 26 are all read out, parameter N is incremented by one in step 116, and it is determined in step 118 whether parameter N is 8 or less. Namely, it is determined whether the data of all areas of the Y memory 26 are read out. When it is determined that the read out of the data of all areas has not yet been completed, the processing routine returns to step 102, in which tracking control of the magnetic head is carried out to a blank track of the magnetic disk D, and the read out of new data of the N-th area is started.

Note that, when the data of the divided image on the right side is read out, by the processing of step 105, the X value of the data read out address executed in step 110 is counted down, and the initial value of the X value of the data read out start address in steps 105 and 108 is set to the final address value of the area R12 of FIG. 3 (address value of the symbol E4 of FIG. 3).

It is also possible to define any address value in the area R11 or R12 as the read out address value of the Y memory 26 in the blanking period T10 which is fixed in steps 104, 105 and 108.

Also the data read out in the R-Y memory 27 and the B-Y memory 28 is carried out in the same way as the read out of data from the Y memory 26.

In this way, the reason why the frame formed by the original image signal of the high vision system is divided and the read out direction of the data of luminance signal and differential color signals of the right side frames F2 and F4 in FIG. 4 is determined to an opposite direction to that of case of the left side frames F1 and F3 is that the pedestal level existing in the periods T3 and T4 (refer to FIG. 4) of the image signal of the high vision system is used as the pedestal level in the blanking period necessary for the image signal of the NTSC system. Note that, the order of data read out in the vertical direction is the same order as the writing of the signal of the high vision system.

Figure 6:
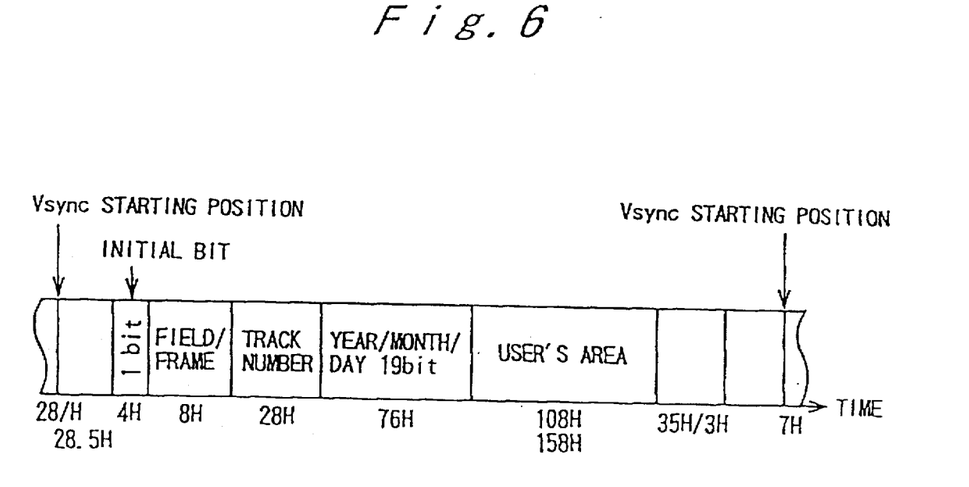
FIG. 6 is a view of the recording format of an ID code.

FIG. 6 shows the format of the ID code recorded on the magnetic disk D. As shown in this drawing, in the ID code, various information, such as, for example, information indicating by which of the field recording mode or frame recording mode the image signal was recorded on the track, information indicating the track number, the date the photograph was taken, etc. are included. Also, a user's area is provided in the ID code. In this user's area, information necessary at the time of reproduction, such as, for example information concerning the system of division of the original image described above and concerning the position of the divided area in the memory etc. are recorded. Accordingly, by using this information of the user's area, it is possible to reconstruct the image signals read out from the respective tracks on the semiconductor memory and reproduce the original image.

The track of the magnetic disk D on which the first area R1 of the Y memory 26 is recorded and the track on which the second area R2 (FIG. is recorded are adjoining each other, and the track on which the second region R2 is recorded is positioned at the inner circumference side of the track on which the first area R2 is recorded. Such a positional relationship also stands between the third area R3 and fourth area R4, between the fifth area R5 and sixth area R6, and between the seventh area R7 and eighth area R8. Accordingly, when the magnetic disk D is read out by the frame mode by a conventionally well known reproduction device, it is possible to display one-fourth of the divided picture on the screen of the display device.

Figure 7:
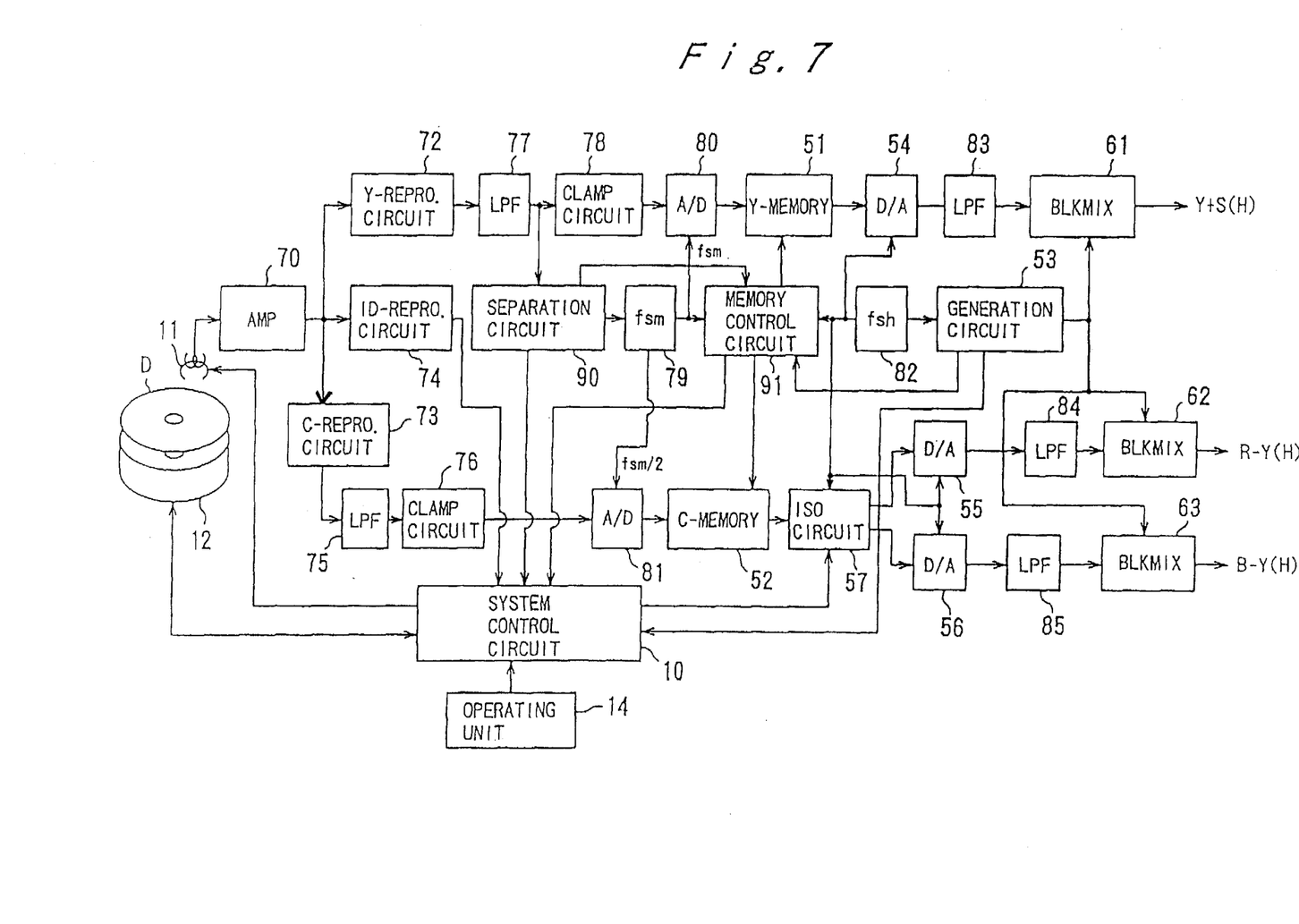
FIG. 7 is a block diagram of a reproduction system of a still video device to which one embodiment of the present invention is applied.

FIG. 7 is a block diagram of a reproduction system of a still video device to which the embodiment of the present invention is applied.

The system control circuit 10, the magnetic head 11, the spindle motor 12, the magnetic disk D, and the operating unit 14 are also included in the recording system shown in FIG. 1. That is, they act for both the recording system and the reproduction system. Further, it is also possible to use the Y memory 26, A/D converters 23 and 24, and the D/A converters 31, 32, and 33 of the recording system shown in FIG. 1 concurrently with the Y memory 51, A/D converters 80 and 81, and the D/A converters 54, 55, and 56.

The magnetic head 11 is positioned at a predetermined track of the magnetic disk D by the control of the system control circuit 10, and the ID code and the image signal of the NTSC system recorded on this track is read out. The image signal and ID code are amplified by the reproduction amplifier 70 and inputted to a Y reproduction processing circuit 72, an ID reproduction processing circuit 74, and a C reproduction processing circuit 73.

The luminance signal (Y+S) including the composite synchronizing signal $\overline{C.SYNC2}$ is subjected to FM modulation at the Y reproduction processing circuit 72 and has its high frequency component removed by the low pass filter 77. Then, the luminance signal (Y+S) is inputted to the clamp circuit 78 and the synchronizing signal separation circuit 90.

In the synchronizing signal separation circuit 90, the composite synchronizing signal $\overline{C.SYNC2}$ is separated from the luminance signal (Y+S), and a blanking signal $\overline{C.BLK2}$ in synchronization with the composite synchronizing signal $\overline{C.SYNC2}$ is produced. The blanking signal $\overline{C.BLK2}$ is inputted to the memory control circuit 91. The composite synchronizing signal $\overline{C.SYNC2}$ is inputted to the clock generation circuit 79 and the system control circuit 10. In the clock generation circuit 79, a clock fsm (frequency sampling pixels of the image signal of the NTSC system) in synchronization with the composite synchronizing signal $\overline{C.SYNC2}$ is produced and is inputted to the A/D converters 80 and 81 and the memory control circuit 91. Note that the clock fsm is the same frequency as the clock fsm used in the recording system of FIG. 1.

In the clamp circuit 78, the pedestal level of the luminance signal (Y+S) is clamped to the reference level of the A/D conversion in the A/D converter 80. In the A/D converter 80, the amplitude value with respect to the pedestal level of the luminance signal is sampled by the clock fsm and is converted to the digital signal.

The differential color signals (R-Y, B-Y) are subjected to FM modulation in the C reproduction processing circuit 73, have their high frequency components removed by the low pass filter 75, and are inputted to the clamp circuit 76. In the clamp circuit 76, the pedestal levels of the differential color signals (R-Y, B-Y) are clamped. Then, the differential color signals (R-Y, B-Y) are sampled by a clock fsm/2 inputted from the clock generation circuit 79 and converted to digital signals in the A/D converter 81.

In the ID reproduction processing circuit 74, the ID code is subjected to DPSK modulation and inputted to the system control circuit 10. In the system control circuit 10, according to the recording information existing in the user's area of this ID code, the data writing address control of the Y memory 51 and C memory 52 with respect to the memory control circuit 91 is carried out. This control will be described later.

The luminance signal converted to the digital signal is controlled at the memory control circuit 91 and sequentially written in the predetermined address of the Y memory 51. Also, the differential color signals converted to the digital signals are written at the predetermined address of the C memory 52 in the same order as that for the writing of the luminance signal to the Y memory 51. Note that, the differential color signals (R-Y, B-Y) are linearly sequentially recorded in the magnetic disk D, and therefore the differential color signal (R-Y) and the differential color signal (B-Y) are alternately written in the C memory 52 at every horizontal scanning line.

In this way, the image signals are read out from the respective tracks of the magnetic disk D for every divided picture shown in FIG. 2 and written in the Y memory 51 and the C memory 52, whereby the data corresponding to the original frame of the high vision system is constructed in the respective memories 51 and 52.

The luminance signal is read out from the Y memory 51 in synchronization with the sampling clock fsh inputted from the clock generation circuit 82 and converted to an analog signal by the D/A converter 54. Then, this luminance signal has its high frequency component removed by the low pass filter 83 and is inputted to the blanking sync mix circuit 61. Note that, the clock fsh is a clock according to the high vision system.

Similarly, the differential color signals (R-Y, B-Y) are read out from the C memory 52 in synchronizing with the clock fsh and inputted to an isochronizing circuit 57. In the isochronizing circuit 57, the same differential color signals (R-Y, B-Y) are repeatedly outputted over two horizontal scanning periods and inputted to the D/A converters 55 and 56. The differential color signals (R-Y, B-Y) are converted to analog signals at the D/A converters 55 and 56, have their high frequency components removed by the low pass filters 84 and 85, and are then inputted to the blanking sync mix circuits 62 and 62.

In the blanking sync mix circuits 61, 62, and 63, the composite synchronizing signal $\overline{C.SYNC1}$ inputted from the synchronizing signal generation circuit 53 is added to the differential color signal (R-Y) and the differential color signal (B-Y) and the result outputted to a display device (not shown) or an external signal output terminal.

Figure 8:
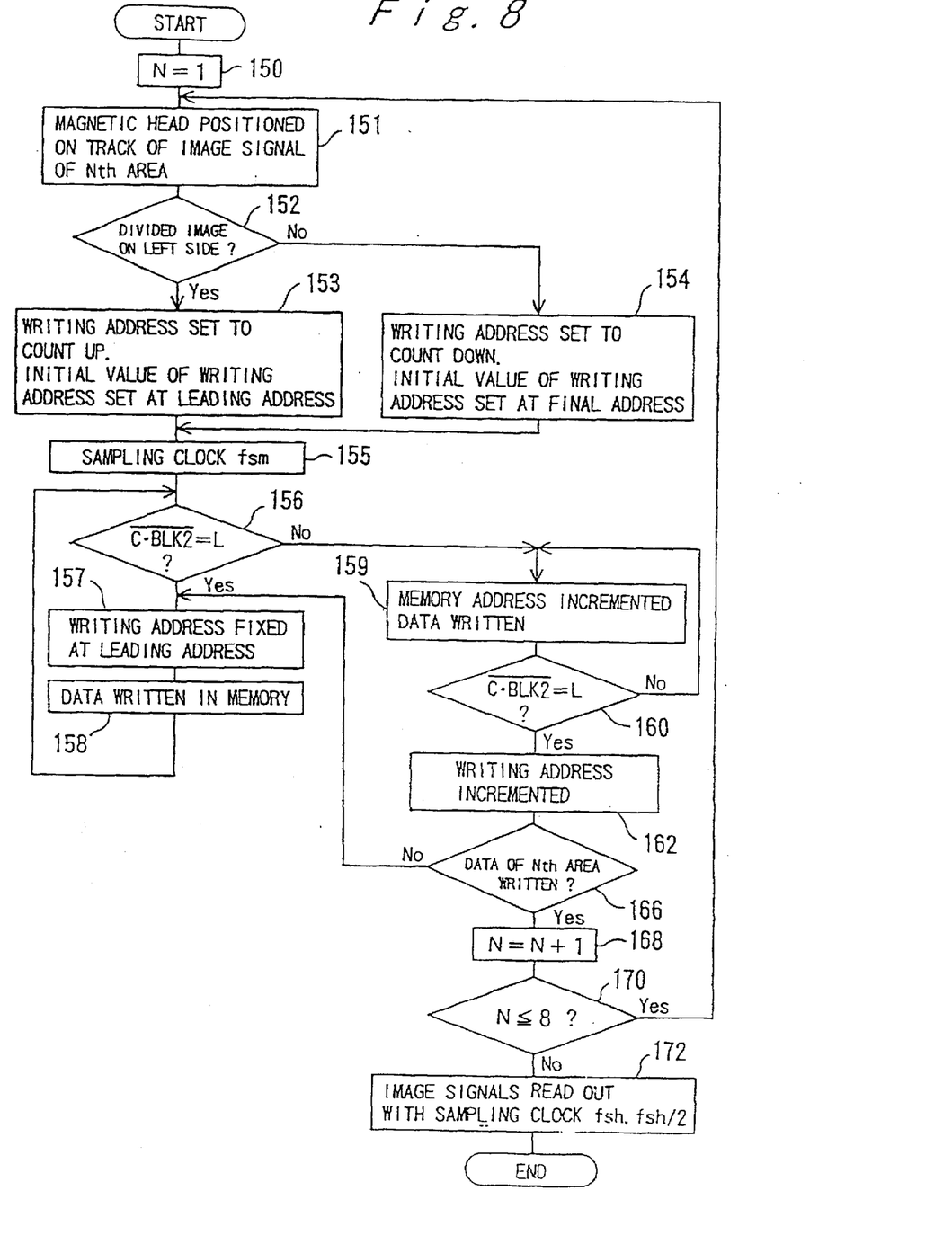
FIG. 8 is a flow chart showing a control for writing an image signal read out from the magnetic disk in the memory and reading the same from the memory.
Figure 9:
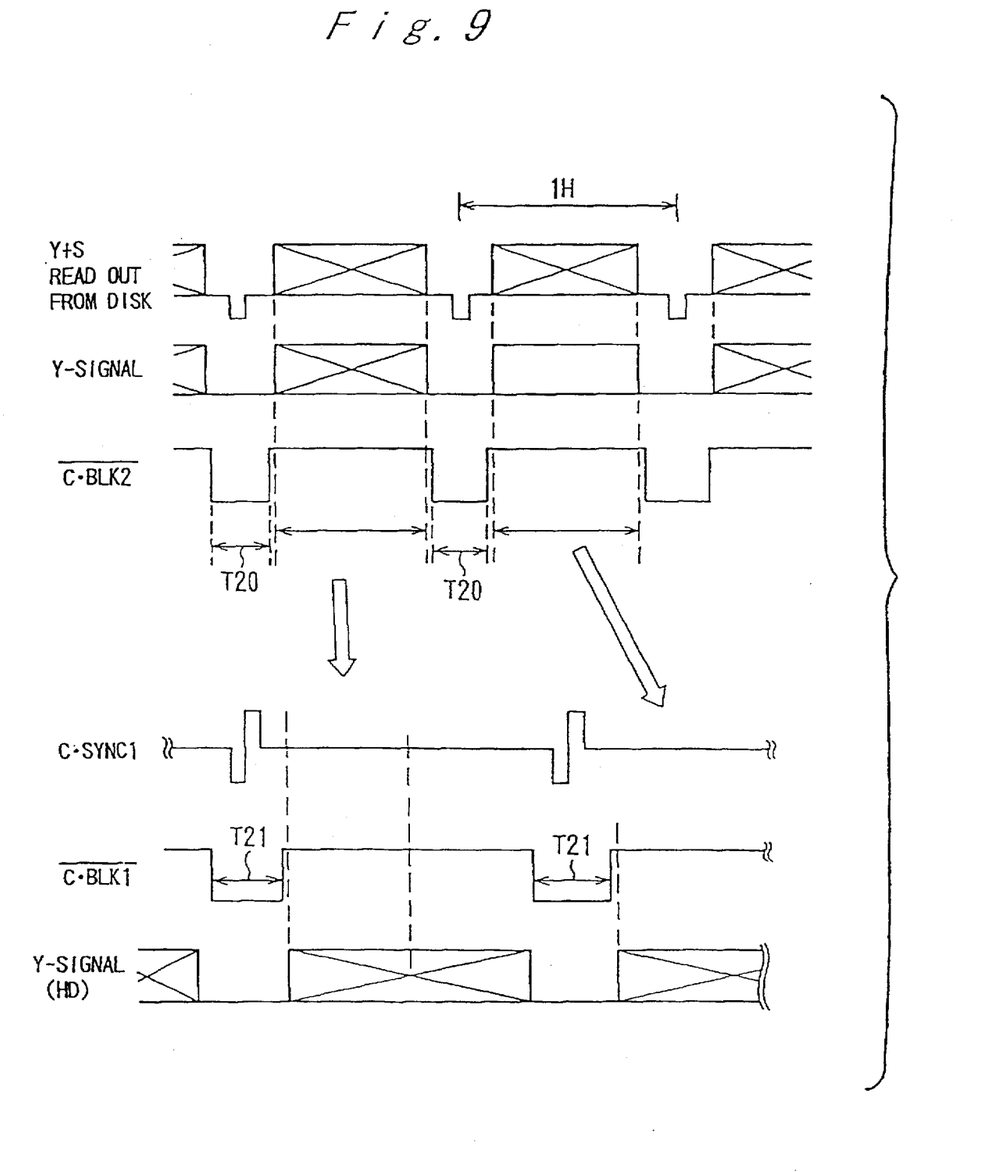
FIG. 9 is a view of the format of a luminance signal and the high vision system signal of the NTSC system read out from the magnetic disk.

The writing and read out control of the luminance signal Y and the differential color signals (R-Y, B-Y) to and from the Y memory 51 and the C memory 52 will be described referring to FIG. 3, FIG. 8, and FIG. 9. FIG. 8 is a flow chart showing the memory writing and read out control of the reproduction system. FIG. 9 is a timing chart of the luminance signal (Y+S), the blanking signal $\overline{C.BLK1}$ of the high vision system, the composite synchronizing signal $\overline{C.SYNC1}$, and the luminance signal Y read out from the magnetic disk D.

In step 150, a parameter N is set to "1". In step 151, the position of the magnetic head 11 is controlled to be positioned at the track on which the image signal of the first area R1 (see FIG. 3) is recorded according to the respective track information of the magnetic disk D stored in the work memory, and the image signal recorded on that track is read out. In step 152, it is determined whether that image signal is the image on the left side in the frame based on the information of the user's area provided in the ID code of the image signal, and it is determined whether it is the image in the area corresponding to a variable N.

When it is determined in step 152 that the image signal corresponds to the image on the left side of the frame (corresponding to the first, second, third, and fourth areas in FIG. 3, parameters N=1, 2, 3, 4), step 153 is executed. When it is determined in step 152 that the image signal corresponds to the image on the right side of the frame (corresponding to the fifth, sixth, seventh, and eighth areas in FIG. 3, parameters N=5, 6, 7, 8), step 154 is executed.

When the image signal corresponding to the left side of the frame is read out from the magnetic disk D, step 153 is executed, and the system is set so that both the X value and Y value of the writing address to the Y memory 51 and C memory 52 are counted up and, at the same time, the initial value of the writing address is set at the leading addresses of the Y memory 51 and the C memory 52 (the address values of the symbol E0 in FIG. 3).

When an image signal corresponding to the right side of the frame is read out from the magnetic disk D, step 154 is executed, and the system is set so that both the X value and Y value of the writing address to the Y memory 51 and C memory 52 are counted down and, at the same time, the initial value of the writing address is set at the last addresses of the Y memory 51 and the C memory 52 (the address values of the symbol E4 in FIG. 3).

In step 155, the system is set so that the writing address values to the Y memory 51 and the C memory 52 are controlled by clock fsm input from the clock generation circuit 79.

In step 156, it is determined whether the blanking signal $\overline{C.BLK2}$ inputted from the synchronizing signal separation circuit 90 is a low level. When it is a low level, that is, it is in a blanking period T20 (see FIG. 9), in step 157, the X value of the writing address is fixed at the leading address value (E0) of the area R11 (see FIG. 3). In step 158, the pedestal levels of the luminance signal and differential color signals read out from the magnetic disk D and separated are repeatedly A/D-converted and written in the leading addresses of the Y memory 51 and the C memory 52. Thereafter, processing returns to step 156 to determine whether the blanking signal $\overline{C.BLK2}$ is still a low level.

When it is determined in step 156 that the blanking signal $\overline{C.BLK2}$ is not at a low level by termination of the blanking period T20, the processing routine shifts to step 159, in which the renewal of the X value of the writing address in the memory control circuit 91 is started, and the data is written to its address of the the Y memory 51 and C memory 52. The order of this writing is the same as that of the memory read out direction at the time of the video image recording and processing to the magnetic disk D. When the data of the left side of the frame (for example in the first area R1) is read out from the magnetic disk D, the data is written according to the arrow direction of the symbol A1 of FIG. 3, and when the data of the right side of the frame (for example in the fifth area R5) is read out from the magnetic disk D, the data is written according to the arrow direction of the symbol A2 of FIG. 3. Note that the Y value of the address is always counted up.

When the data is written in the Y memory 51 and C memory 52, it is determined in step 160 whether the blanking signal $\overline{C.BLK2}$ is at a low level, that is, whether it has become the blanking period T20 again. When it is not in the blanking period T20, the X value of the memory address value is incremented by one, and the data is written again in the Y memory 51 and C memory 52 at step 159. Thus, the writing operation of the data is carried out, and the luminance signal and differential color signals of one horizontal scanning period of the NTSC system are written in the N-th area shown in FIG. 3.

In step 160, when the blanking signal $\overline{C.BLK2}$ changes to the low level and it is determinned that the period becomes the blanking period T20 again, the Y value of the writing address is incremented by one in step 162, and it is determined in step 166 whether the writing of data to the N-th area of the Y memory 51 and C memory 52 is completed. When the writing of data to the N-th area has not yet been completed, the processing routine returns to step 157, in which the X value of the writing address is fixed again at the leading address of the area R11, and the pedestal level is written in that address during the term for which the blanking signal $\overline{C.BLK2}$ is at a low level. Then, when it is determined in step 156 that the blanking signal $\overline{C.BLK2}$ changed to the high level, the processing routine shifts to step 159 again, and the luminance signal and differential color signals in the next horizontal scanning period are written in the memory.

In step 166, when it is determined that the luminance signal and differential color signals read out from the magnetic disk D are all written in the N-th area, the parameter N is incremented by one at step 168, and then it is determined in step 170 whether parameter N is 8 or less. When parameter N is 8 or less, the writing of data to all the areas R1 to R8 of the Y memory 51 and C memory 52 has not been ended, and therefore, the processing routine returns to step 151, in which the magnetic head 11 moves to the next track defined by the parameter N, and a new image signal is read out.

When the data is written in all areas R1 to R8 of the Y memory 51 and C memory 52, the processing routine shifts from step 170 to step 172, in which the data of the Y memory 51 and C memory 52 is read out and outputted to the display device.

Note that, in step 172, the data read out address value is produced based on the sampling clock fsh or fsh/2 outputted from the clock generation circuit 82.

Also, the read out of data of the Y memory 51 and C memory 52 in step 172 is carried out sequentially from the leading address. At this read out, in the blanking period T21 (see FIG. 9) of the blanking signal $\overline{C.BLK1}$ inputted from the synchronizing signal generation circuit 53 to the memory control circuit 91, the read out address value is fixed to the leading address value of the area R11. Namely, the pedestal level of the blanking period necessary for the image signal of the high vision system to be restored is produced using the data of the area R11 of the Y memory 51 and C memory 52. Then, the luminance signal and differential color signals are read out from the Y memory 51 and C memory 52 in the same order as that for the memory writing control carried out when the high vision signal is divided for the frame and recorded on the magnetic disk D.

As described above, in the present embodiment, when an image signal of the high vision system having many scanning lines is divided and recorded on the magnetic disk D by the NTSC system, the pedestal level of the high vision signal written as it is in the respective memories is used for forming the blanking period at conversion to the NTSC system. Accordingly, it is not necessary to provide a special circuit for producing the blanking period as in the conventional device, and the blanking period is easily formed by the memory address control at the time of memory writing and read out, whereby the scale of the entire device is further reduced.

Also, in the present embodiment, the high resolution image divided and recorded on the magnetic disk D was a high vision signal, but the present invention is not restricted to this, and an image of any system can be used.

Further, it is also possible even if the number of parts the input image is divided into is other than four. Namely, it is possible even if the number is two, but in this case, the frame is divided in the vertical direction. Note that, the order of read out of the areas of the divided frames from the Y memory 26, the R-Y memory 27, and the B-Y memory 28 is not restricted to the order as shown in FIG. 3. Namely, it is also possible even if after the data of the first and second areas are recorded, the data of the fifth and sixth areas are recorded next, and then the data of the third and fourth areas and the data of the seventh and eighth areas are recorded.

Also, an explanation was made of only the reproduction of the original frame from the divided frames in the reproduction operation of the present embodiment, but it is also possible to constitute the device so that each of the divided frames is reproduced alone. Namely, so as to enable reproduction of the image of only the right top divided frame of the conventional still video frame, concerning the areas R5 to R8 recording the image signal in the arrow direction of the symbol A2 of FIG. 3, the data is written in the memory along the arrow direction thereof at the time of reproduction of the partial image, and when the data is read out from the memory so as to display the same on the display device, scanning is carried out from the left to right for the reproduction. By this, the image of the divided part can be reproduced by itself.

Although the embodiments of the present invention have been described herein with reference to the accompanying drawings, obviously many modifications and changes may be made by those skilled in the art without departing from the scope of the invention.

The present disclosure relates to subject matter contained in Japanese Patent Application No. HEI 5-153047 (filed on May 31, 1993) which is expressly incorporated herein, by reference, in its entirety.

We claim:

1. A still image signal processing device, comprising:
   a memory for storing a first image signal generated in accordance with a first mode, said first image signal having image signal data and pedestal level data in one horizontal scanning period;
   means for writing said first image signal to said memory in such a manner that said pedestal level data and said image signal data are stored in an order in which said pedestal level data and said image signal data are inputted in said still image signal processing device; and
   first reading means for reading said first image signal from said memory to generate a second image signal in accordance with a second mode, said first reading means reading said first image signal in such a manner that said first image signal is divided into a first half and a latter half by a dividing line that passes through a center of said first image signal at a substantially right angle to a horizontal scanning line, said first reading means reading said latter half in a direction substantially parallel to said horizontal scanning line and opposite to a reading direction of said first half, which is substantially parallel to said horizontal scanning line, so that a blanking period of said second mode is formed in accordance with said pedestal level data, said pedestal level data comprising first pedestal level data provided in front of said image signal data, and second pedestal level data provided behind said image signal data.

2. A device according to claim 1, wherein said first mode comprises a high definition image mode, and said second mode comprises a standard image mode.

3. A device according to claim 1, further comprising means for storing said first pedestal level data, said image signal data and said second pedestal level data in said memory in a predetermined order corresponding to a horizontal scanning direction of said image signal data.

4. A device according to claim 1, further comprising means for sequentially storing said first pedestal level data, said image signal data and said second pedestal level data in said memory from a small address to a large address.

5. A device according to claim 1, wherein each of said first and second pedestal level data comprises data of at least one pixel.

6. A device according to claim 1, wherein said reading means reads said first half of said first image signal in such a manner that said blanking period is formed in accordance with said first pedestal level data, said reading means reading said latter half of said first image signal in such a manner that said blanking period is formed in accordance with said second pedestal level data.

7. A device according to claim 1, wherein said reading means reads said first pedestal level data and said second pedestal level data repeatedly in said blanking period of said second mode.

8. A device according to claim 1, wherein said reading means reads said first half of said first image signal from a portion close to said first pedestal level data to said predetermined point and reads said latter half of said first image signal from a portion close to said second pedestal level data to said predetermined point.

9. A device according to claim 1, further comprising means for recording said second image signal in a recording medium.

10. A device according to claim 9, wherein said recording means records information in said recording medium which is necessary to reproduce said second image signal.

11. A device according to claim 10, further comprising second reading means for reading said second image signal from said recording medium, means for converting said second image signal to a third image signal in accordance with said first mode to write said third image signal to said memory in such a manner that said third image signal has an image signal data divided into a first half and a latter half at said predetermined point, a third pedestal level data provided in front of said first half, and a fourth pedestal level data provided behind said second half.

12. A device according to claim 11, wherein said converting means writes said first half of said third image signal from a portion close to said third pedestal level data to said predetermined point, and writes said latter half of said third image signal from a portion close to said fourth pedestal level data to said predetermined point.

13. An image signal processing device, comprising:
   means for writing, when an input image signal having a high resolution is converted to digital data and is sequentially written in a memory, pedestal level data of a blanking period of said input image signal in adjoining areas of an image data writing area of one horizontal scanning period of said input image signal of said memory in an amount of at least one pixel;
   means for dividing an original frame constituted by said input image signal into two frames divided by a line that is substantially perpendicular to a horizontal scanning line direction;
   image data division means for reading out, when said image data of said memory corresponding to a left part of said divided frame is to be read out, said image data in a same direction to said horizontal scanning line direction of said input image signal, for sequentially reading out said image data in the opposite direction to said horizontal scanning line direction of said input image signal when said image data of said memory corresponding to a right frame of said divided frame is to be read out, and for forming a blanking period of a format of said image signal having a low resolution using said pedestal level data written to said memory when said data is read out from said memory, said pedestal level data comprising first pedestal level data provided in front of said input image signal, and second pedestal level data provided behind said input image signal; and
   means for converting said image data read out from said memory by said image data division means to analog signals and, at the same time, adding a synchronizing signal of said image signal format having a low resolution to said analog signals and sequentially recording said analog signals on respective tracks of a magnetic disk.

14. A still image signal processing device, comprising:

a memory that stores data representing scan lines of a frame of an image signal, generated in accordance with a first mode, that has been divided into a first portion and a second portion by a dividing line that passes through a center of said frame at a substantially right angle to a horizontal scanning line, said data of said first portion and said data of said second portion each representing image signal data and pedestal level data of a horizontal scanning period; and means for reading said first portion and said second portion from said memory in a direction parallel to said horizontal scanning line to reconstruct said frame of said image signal in accordance with a second mode, said second portion being read in an order opposite from said reading of said first portion, wherein said pedestal level data comprises first pedestal level data provided in front of said image signal data, and second pedestal level data provided behind said image signal data.

15. The still image signal processing device of claim 14, wherein said first mode comprises a high definition image mode and said second mode comprises a standard image mode.

16. The still image signal processing device of claim 11, wherein said reading means reads said data of said first portion in such a manner that a blanking period is formed in accordance with said first pedestal level data, said reading means reading said data of said second portion in such a manner that said blanking period is also formed in accordance with said second pedestal level data.

* * * * *